(No Model.)
G. B. WHITING.
Automatic Detaching and Lock Hook.
No. 240,565. Patented April 26, 1881.
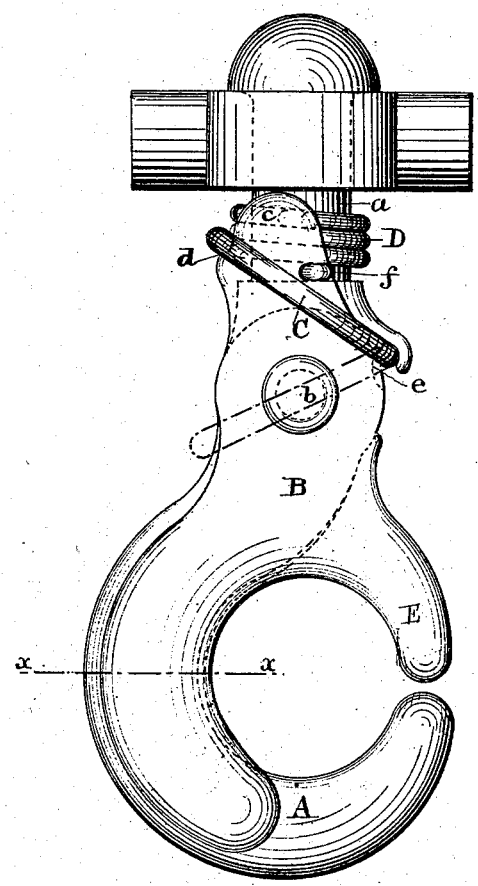
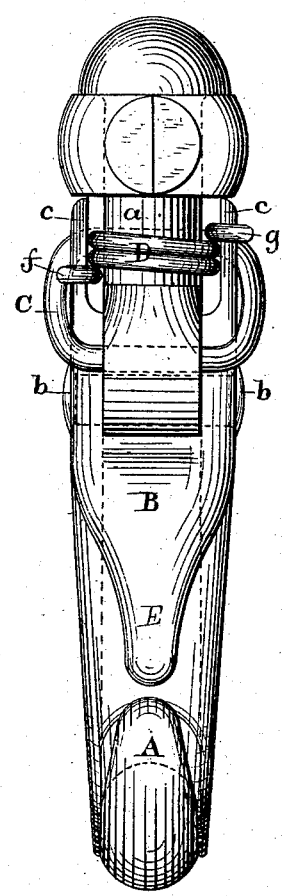
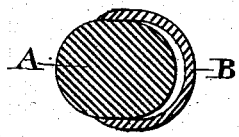
WITNESSES:
INVENTOR

United States Patent Office.

GEORGE B. WHITING, OF WASHINGTON, DISTRICT OF COLUMBIA, ASSIGNOR TO JOHN CALDWELL, OF SHREVEPORT, LOUISIANA, AND OSCAR E. HUSS, OF WASHINGTON, DISTRICT OF COLUMBIA.

AUTOMATIC DETACHING AND LOCK HOOK.

SPECIFICATION forming part of Letters Patent No. 240,565, dated April 26, 1881.

Application filed December 18, 1880. (No model.)

*To all whom it may concern:*

Be it known that I, GEORGE B. WHITING, a citizen of Washington, residing at Washington, in the District of Columbia, have invented certain new and useful Improvements in Automatic Detaching and Lock Hooks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an automatic detaching and lock hook that may be applied to the use of ropes, chains, rings, and shackles in connection with boat-davits, cranes, and for other purposes, the object being to construct a hook that shall be reliable and safe, and that can be readily and easily attached, and, if required, locked in position, or as promptly and quickly detached from its connection with the rope, chain, ring, shackle, or other attachment.

My invention consists in an automatic detaching and lock hook having a hook and a detaching-arm, the latter pivoted to the upper or rear portion of the hook and embracing the body of the hook.

My invention further consists in an automatic detaching and lock hook having a detaching-arm provided with a mousing-spur pivoted to and embracing the main body of the hook.

My invention further consists in an automatic detaching and lock hook consisting, essentially, of a detaching-arm, a hook with an extended shank, and a spring coiled around the shank of the hook, so as to engage with the detaching-arm.

My invention further consists in the combination, in a detaching-hook, of a detaching-arm, coil-spring, and link, for the purpose hereinafter stated.

My invention further consists in the novel construction and combination of parts, as will be hereinafter more fully set forth and specifically claimed.

Figure I is a side elevation. Fig. II is an end elevation. Fig. III is a cross-section on line $x\ x$.

In Figs. I and II, A represents the main body of the hook, which terminates with a shank or journal, $a$, by which it is coupled to the nut or collar of a block or other attachment and fitted to turn and swivel freely.

To the main body of the hook is pivoted the detaching-arm B by the pin $b$. The arm is made with a mousing-spur, E, for closing the opening of the hook, and is also fitted to partially embrace the hook when in a closed or locked position.

A spring, D, is coiled around the shank $a$ of the hook, and its two ends $f$ and $g$ are bent to clasp and thrust against the extensions $c\ c$ of the arm B.

A link, C, for locking the hook is secured in the slot $e$ by the arm B and fitted to engage with the extensions $c\ c$ of the arm B, and settles in the depressions $d\ d$ when the hook is in a locked position, and when the link C is depressed, as shown by the dotted lines in Fig. I, the hook is unlocked, and the spring D acting upon the extensions $c\ c$, the arm B is forced against the rope, ring, or shackle, detaching the same from the hook.

I prefer placing the spring around the shank of the hook, because it acts with more efficiency and is more economically constructed than when otherwise located, and also avoids the liability of becoming clogged by ice in winter. I do not wish, however, to confine myself to the location of the spring around the shank of the hook, as it may be otherwise placed and the same result secured.

Having thus described my invention, what I claim, and desire to secure by Letters Patent, is—

1. In an automatic detaching and lock hook, a hook and a detaching-arm, the latter pivoted to the upper or rear portion of the hook and embracing the body of the hook, substantially as described, and for the purpose stated.

2. In an automatic detaching and lock hook, a detaching-arm, B, provided with a mousing-spur, E, pivoted to and embracing the body of the hook, substantially as set forth, and for the purpose described.

3. An automatic detaching and lock hook composed, essentially, of a detaching-arm, a hook with an extended shank, and a spring coiled around the shank of the hook, so as to engage with the detaching-arm, substantially as described, and for the purposes stated.

4. The combination, in a detaching-hook, of a detaching-arm, B, coil-spring D, and a link, C, whereby a swinging motion of the link into an upper seat locks the detaching-arm, and, being thrown out of the depression, unlocks the detaching-arm and leaves the hook free for discharging or casting off the rope or other device placed therein, substantially as described, and for the purposes stated.

5. An automatic detaching-hook consisting of a detaching-arm with its mousing-spur pivoted to and embracing the main body of the hook, together with a coiled spring made to thrust against the extensions of arm, and a link for locking the same in position, substantially as shown and described.

6. An automatic hook having a detaching-arm, B, with extensions $c\ c$, and mousing-spur E, spring D, and locking-link C, substantially as and for the purpose specified.

7. The automatic hook herein described, constructed of the main body A, pivoted detaching-arm B, with its mousing-spur E, extensions $c\ c$, spring D, and link C, all constructed and arranged substantially as shown and set forth.

In testimony whereof I affix my signature in presence of two witnesses.

GEO. B. WHITING.

Witnesses:
W. S. MOORE,
HERSCHEL MAIN.